(12) United States Patent
Gorin et al.

(10) Patent No.: US 9,876,324 B2
(45) Date of Patent: Jan. 23, 2018

(54) RETRACTABLE WALL MOUNTED ELECTRICAL PLUG FOR CHARGING COMMUNICATION DEVICES

(71) Applicants: Thomas Michael Gorin, Atlanta, GA (US); James Loye Hutchinson, Dallas, GA (US); Cassidy Amber Jones, Mableton, GA (US); Jeremy Sabri Omess, Sandy Springs, GA (US); Nicolas Juan Nuñez, Suwanee, GA (US); Hagan Seth McBride, Duluth, GA (US)

(72) Inventors: Thomas Michael Gorin, Atlanta, GA (US); James Loye Hutchinson, Dallas, GA (US); Cassidy Amber Jones, Mableton, GA (US); Jeremy Sabri Omess, Sandy Springs, GA (US); Nicolas Juan Nuñez, Suwanee, GA (US); Hagan Seth McBride, Duluth, GA (US)

(73) Assignee: DATA:)COMM ELECTRONICS, INC., Norcross, GA (US)

( * ) Notice: Subject to any disclaimer, the term of this patent is extended or adjusted under 35 U.S.C. 154(b) by 0 days.

(21) Appl. No.: 15/208,901

(22) Filed: Jul. 13, 2016

(65) Prior Publication Data
US 2017/0324200 A1  Nov. 9, 2017

Related U.S. Application Data

(63) Continuation-in-part of application No. 29/563,313, filed on May 4, 2016.

(51) Int. Cl.
*H01R 13/72* (2006.01)
*H01R 25/00* (2006.01)
(Continued)

(52) U.S. Cl.
CPC .......... *H01R 25/006* (2013.01); *H01R 13/66* (2013.01); *H01R 24/60* (2013.01); *H01R 2107/00* (2013.01); *H02G 11/02* (2013.01)

(58) Field of Classification Search
CPC ............................... H01R 13/72; H02G 11/02
(Continued)

(56) References Cited

U.S. PATENT DOCUMENTS 4,415,219 A * 11/1983 Kuhl .................... H01R 13/567
                                                       439/694
4,857,013 A *  8/1989 Peters .................... H01R 24/28
                                                       439/484

(Continued)

FOREIGN PATENT DOCUMENTS

DE           3736330 A1 *  5/1989  ............. H01R 19/40

*Primary Examiner* — Tho D Ta
(74) *Attorney, Agent, or Firm* — Thomas | Horstemeyer, LLP

(57) ABSTRACT

A retractable electrical plug for mounting in a hollow wall structure of a building and for charging the batteries of portable communication devices, including a face plate for mounting to hollow wall structures defining on its exterior surface a plug recess, a plug shaped to nest in the plug recess, a cord opening in the face plate extending from the plug recess to the interior surface of the face plate, and an electrical conductor cord that extends from the plug and through the cord opening into the hollow wall.

19 Claims, 3 Drawing Sheets

(51) Int. Cl.
    *H01R 13/66* (2006.01)
    *H01R 24/60* (2011.01)
    *H01R 107/00* (2006.01)
    *H02G 11/02* (2006.01)

(58) Field of Classification Search
    USPC .................. 439/131, 501, 528, 483, 923
    See application file for complete search history.

(56) References Cited

U.S. PATENT DOCUMENTS

| | | |
|---|---|---|
| 5,562,488 A | 10/1996 | Neiser et al. |
| 5,700,158 A | 12/1997 | Neiser et al. |
| 5,723,815 A | 3/1998 | Pena |
| 5,773,757 A | 6/1998 | Kenney et al. |
| 6,386,908 B2 * | 5/2002 | Kato ................ H01R 13/60 439/357 |
| 6,648,677 B1 | 11/2003 | Boyd |
| 6,848,937 B1 * | 2/2005 | Hsiao ............... H02G 11/02 439/501 |
| 7,000,746 B2 | 2/2006 | Mackin et al. |
| 7,052,309 B1 * | 5/2006 | Chen ............... H01R 13/6335 439/484 |
| 7,063,558 B1 * | 6/2006 | Chen ............... H01R 13/6335 439/483 |
| 7,309,834 B1 * | 12/2007 | Byrd ............... B65H 75/425 174/135 |
| 7,741,562 B2 | 6/2010 | Crotinger et al. |
| 7,857,659 B2 | 12/2010 | Wang et al. |
| 7,915,529 B2 | 3/2011 | Crotinger et al. |
| 8,415,920 B2 | 4/2013 | Liao |
| 2011/0215759 A1 | 9/2011 | Lee et al. |
| 2011/0272959 A1 * | 11/2011 | Lupton, III ........... B60R 7/06 296/37.8 |
| 2013/0244475 A1 * | 9/2013 | Sayadi ............... H01R 13/72 439/501 |
| 2014/0306661 A1 | 10/2014 | Rosenblum et al. |

* cited by examiner

RETRACTABLE WALL MOUNTED ELECTRICAL PLUG FOR CHARGING COMMUNICATION DEVICES

PRIORITY

This application claims the benefit of U.S. Provisional Patent Application No. 62/251,330, filed Nov. 5, 2015.

BACKGROUND OF THE INVENTION

Portable hand held communication devices are powered by batteries and the power or charge of the battery depletes over time from use by its users. The hand held devices have an access port or "jack" for receiving a USB (universal serial bus) plug. An insulated power cord has a USB plug at one end for connection to the port of the hand held device and a conventional wall plug at its other end for connection to the conventional wall socket of a dwelling.

While this arrangement seems to be convenient and useful, there are problems usually associated with the conventional power cords since the user of such a cord would likely want to move it to other locations, such as in different rooms of a house or from one house to another, etc., or to a vehicle. A result is that the rechargeable power cord is likely to be misplaced and "lost" temporarily or permanently or unavailable to its owner. While this problem can be solved by maintaining the power cord plugged in at a single outlet and never moving it, there likely will be exceptions to the effort to maintain the power cord in a single location.

The lost power cord is likely to cause substantial frustration by the owner and other users of the power cord, and in many situations the owner of the missing power cord is likely to purchase a substitute power cord.

Another undesirable feature of the power cords described above is that the insulated power cord usually has a length of about two feet and when the cord is not connected to the communication device it extends from its wall plug out onto a counter top, desk top or other horizontal surfaces and it presents an undesirable cluttered appearance.

For these and other reasons it would be desirable to have a "docking station" for a communication power cord that is neat in appearance, is in a stationary location, and is conveniently used for the purpose of charging hand held communication devices and other devices that have a plug receptacle used for recharging.

SUMMARY OF THE INVENTION

Briefly described, this invention concerns a retractable wall-mounted electrical plug for charging a battery of a communication device, such as a hand held communication device. Generally, an open face support box is provided for mounting in the interior of a hollow wall of a building structure, with its opening facing the room of the building structure. A face plate is mounted to the support box about the support box opening and closes the support box opening. The face plate includes an exterior surface that faces away from the support box and its back side is exposed to the interior of the support box.

The exterior surface of the face plate defines a plug recess, and an electrical plug is sized and shaped to telescopically fit into the plug recess. A cord opening extends from the plug recess of the face plate to the interior of the support box, providing a small passage between the outside and inside of the face plate and into the support box.

An insulated electrical conductor cord includes an outer end connected to the plug and an intermediate portion that extends between the plug and through the cord opening of the plug recess, and into the support box. An inner end of the electrical cord in the support box is connected to an electrical current source.

A spring, such as a coil tension spring, is mounted between the interior of the support box and the interior end of the electrical cord and is configured for biasing the electrical cord through the cord opening of the face plate and into the support box. This urges the plug toward the wall plate and into the plug recess of the wall plate, supporting the plug and the insulated electrical conductor cord at an accessible, convenient and visually clean configuration.

The electrical plug includes a plug body, an electrical contact extending in a first direction away from the plug body, a finger grip that extends from the plug body in a direction normal to the first direction of the electrical contact, and an insulated electrical cord extending from the plug body in the direction opposite the finger grip. The plug recess that is formed in the exterior surface of the face plate is configured to be compatible with the shape of the retractable electrical plug so that when the plug is inserted in the recess, the plug body and the electrical contact may be received in and supported in the recess of the face plate, with its electrical contact shielded from inadvertent engagement by an outside object.

When the plug is resting in the recess of the face plate, the finger grip of the plug may extend from the plug support box in a direction away from the face plate, preferably beyond the surface of the face plate and is shaped for grasping by the fingers of the user so that the user can grasp the plug and gently pull the plug away from the wall plate. This retrieves the plug from the face plate, and pulls the adjacent end of the insulated electrical conductor cord with the plug from the interior of the plug support box. This may also allow flexible use of the communication device when the plug is connected to the communication device, and also allows the communication device to be laid to rest on a table surface or other horizontal surface adjacent the face plate when being charged.

When the communication device has been recharged and is ready for further use, the plug can be moved out of the receptacle of the communication device and the spring behind the face plate pulls the electrical cord and therefore urges the plug back toward its plug recess that is formed in the exterior surface of the face plate.

This safely stores the electrical conductor of the plug out of the way and ready for repeated use.

The face plate guards the plug against deterioration by impact from other objects and moisture, and the size of the opening from the recess through the material of the face plate is so small that it is unlikely that moisture or other contaminants would be likely to reach through the face plate openings to the interior of the wall box.

Optionally, the electrical plug can also include other items, such as a typical three prong power port for conventional electrical products such as lamps and other devices that require a continuous charge of electricity.

Thus, it is an object of this invention to provide a retractable electrical plug that is to be mounted in a hollow wall structure or the like for recharging a battery charged portable communication device.

Another object is to maintain a retractable charge plug in a retracted location and one that includes an extendable and retractable plug for charging the communication device and is easy to use and then stored in a safe condition for later use.

Other objects, features and advantages of the present invention will become apparent upon reading the following specification, taken in conjunction with the accompanying drawings.

DETAILED DESCRIPTION

Figure 1:
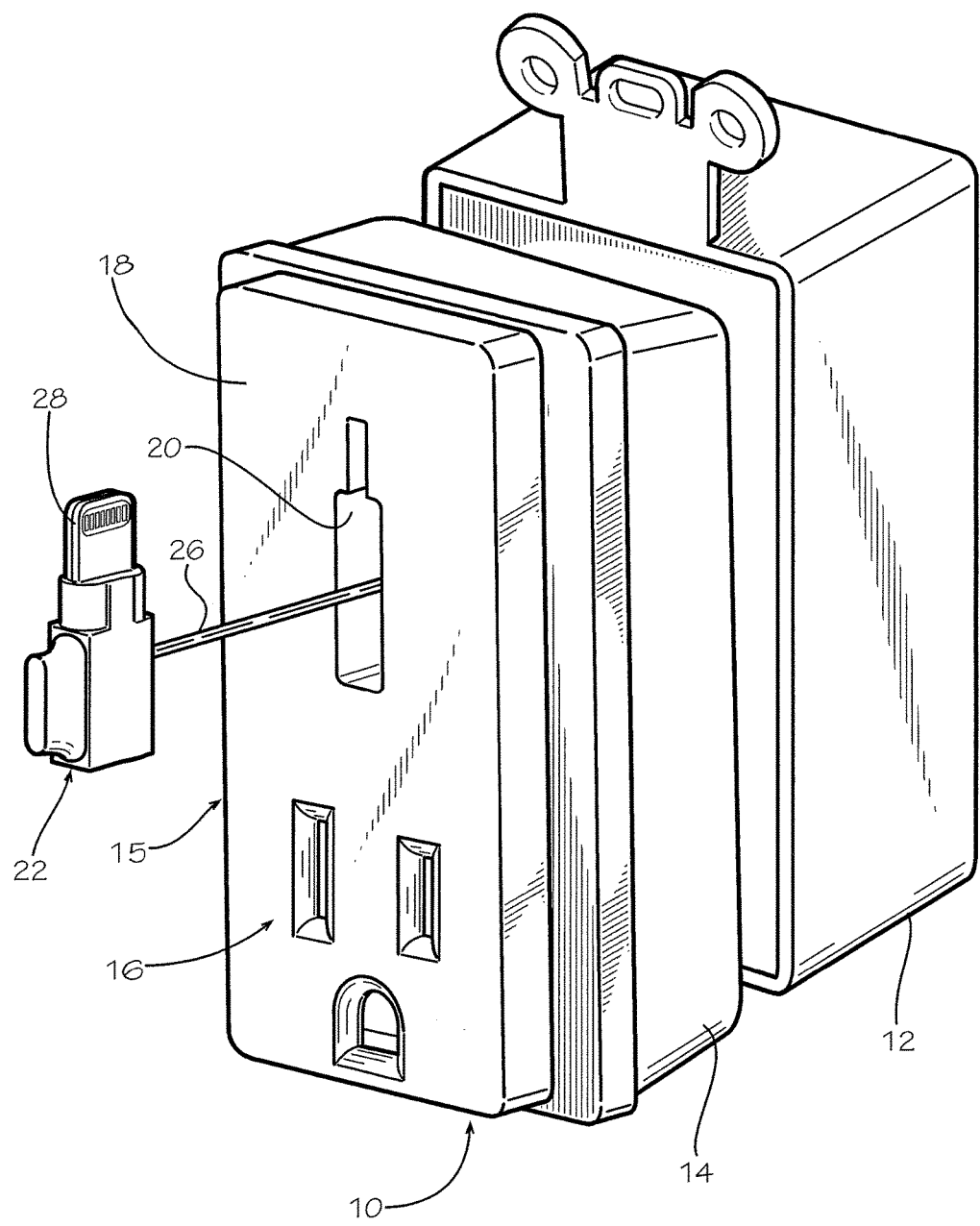
FIG. 1 is a perspective view of the external components of the retractable wall mounted electrical plug, showing the plug partially extended from its face plate, and with its insulated electrical cord extending from the plug back through its shaped plug recess and through the opening in the face plate.
Figure 2:
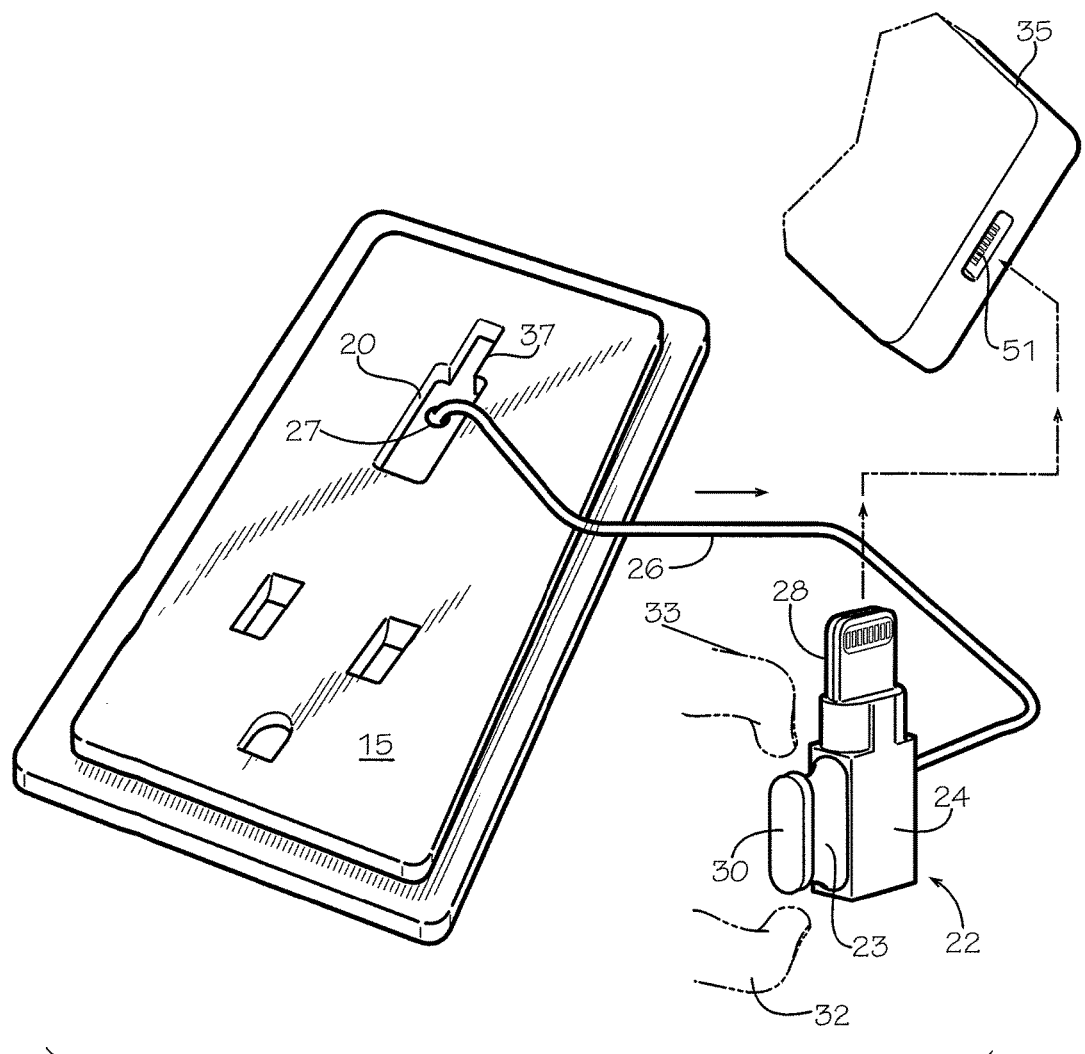
FIG. 2 is a perspective view similar to FIG. 1, but shows how the plug may be withdrawn from the plug recess of the wall plate and plugged into the port of a communication device.

Referring now in more detail to the drawings, in which like numerals indicate like parts throughout the several views, FIGS. 1 and 2 illustrate a conventional wall support box 12 that fits into a hollow wall structure, a plug support box 14 that may be telescopically supported by the wall support box, and a face plate 15 that is mounted to the plug support box. If desired, conventional plug receptacle openings 16 may be formed through the face plate exterior surface 18 for alignment with a conventional jack, not shown.

As best shown in FIG. 2, plug recess 20 is formed in the face plate 15 and an electrical cord opening 27 extends from recess 20 on through the face plate to the interior of the plug support box 14. Electrical plug 22 is sized and shaped to fit in the recess 20. The electrical plug 22 includes a plug body 24, and its electrical contact 28 that extends from the plug body. The plug body 24 and electrical contact 28 are sized and shaped to telescopically fit within the plug recess 20 of face plate 15.

An enlarged finger grip 30 extends from the plug body at an angle, preferably at a right angle, from the electrical contact 28. This allows the enlarged finger grip 30 to protrude from the surface of the face plate 15 when the plug body 24 and electrical contact 28 are inserted in the recess 20, for easy gripping by a person's fingers, such as the fingers 32 and 33 of FIG. 2.

The enlarged finger grip 30 protrudes laterally about the stem 23 so that the stem is positioned between the enlarged finger grip 30 and the plug body 24, and allows for easy pulling of the electrical plug 22 from the plug recess 20.

When the plug 22 has been used to charge an electrical communication device, such as the product illustrated at 35 of FIG. 2, the plug can be pulled out and removed from the port 51 of the device 35 and then returned to its plug recess 20 in the face plate, where it is protected inside the plug recess with the enlarged finger grip protruding out from the plane of the flat surface of the face plate. When the plug is returned to its plug recess, the electrical cord 26 and its opening 27 are substantially covered by the plug 24, and the insulated electrical conductor cord 26 substantially fills the opening 27 so as to retard, or block communication of moisture through the face plate 15.

As shown in dash lines of FIG. 2, a magnet 37 is mounted to the internal surface of the face plate 15. When the electrical plug 24 is inserted into its plug recess 20, the magnet applies a magnetic force that tends to attract the metal of the plug body 24 into its "nested" position within the plug recess 20, thereby assuring that inadvertent removal of the plug body 24 from its plug recess likely will be avoided.

A spring (not shown in FIGS. 1 and 2) is mounted in the plug support box 14 that applies a force to the insulated electrical conductor cord 26 to urge the electrical plug 24 toward its plug recess 20.

Figure 3:
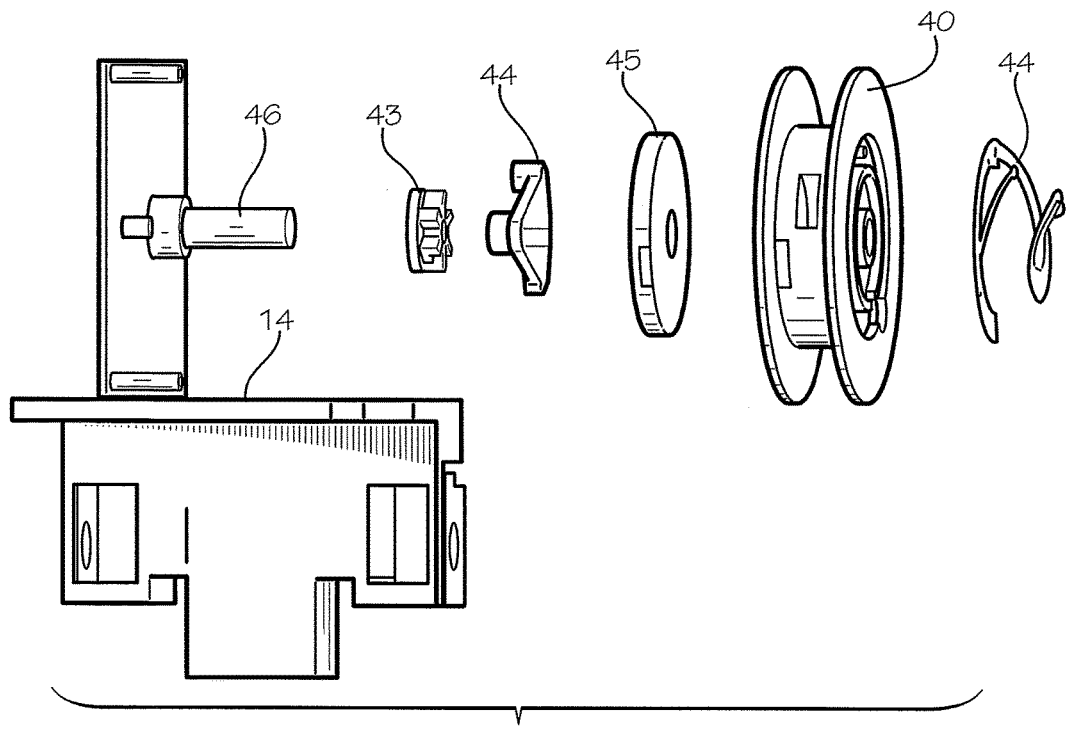
FIGS. 3 and 4 are expanded views of the internal components of the retractable wall mounted electrical plug.
Figure 4:
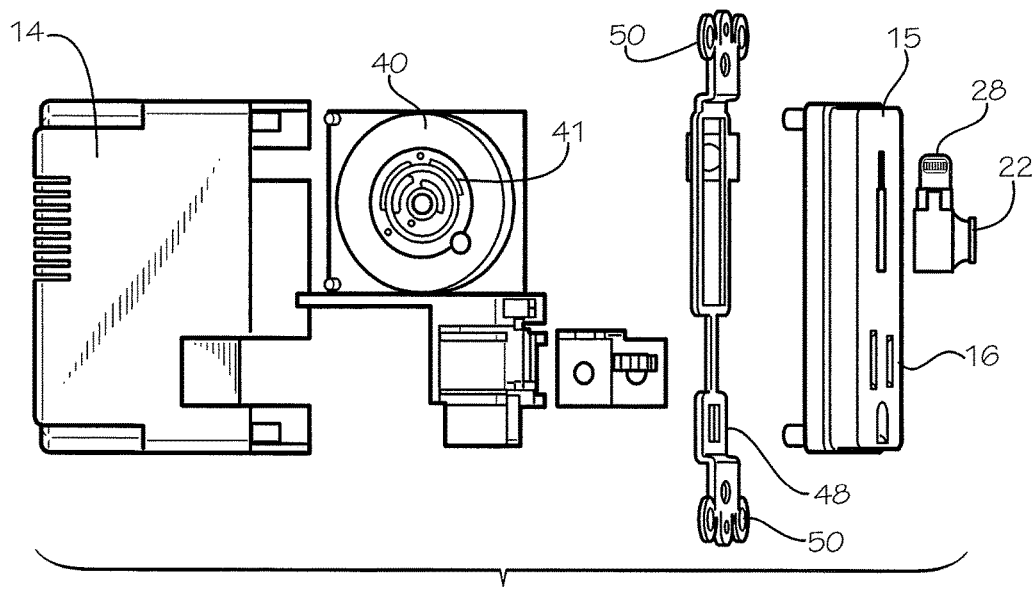

As shown in FIGS. 3 and 4, the plug support box 14 includes a support stem 46 that supports a reel 40 that is biased by the spring and which retrieves the insulated electrical conductor cord 26. A circular electrical conductor strip 41 is mounted to the reel 40 and contact is made with the conductor strip to impart electrical current to it. The electrical conductor cord 26 is also connected to the conductor strip 41, thereby transmitting electrical current through the cord 26 to the plug 22.

A gear 43, ratcheting arm 44, and disk 45 are mounted to the reel 40 on one side of the reel, with the conductor strip 41 on the opposite side thereof, in the conventional manner. These items are rotatably mounted on the stem 46. Support web 48 of FIG. 4 is configured for supporting the elements of FIG. 3 from the conventional hanger loops 50 that connect to the wall structure of the dwelling on which the electrical plug assembly is mounted.

Other prior art spring and reel configurations may be used as desired.

When the retractable wall mounted electrical plug is attached to a conventional hollow wall structure, the insulated electrical conductor cord 26 will be charged with electricity and ready for recharging a battery of a communication device, such as device 35 of FIG. 2. Electrical plug 22 will be retained in its plug recess 20 of the face plate 15 until it is to be used to recharge the battery of the device 35.

As shown in FIG. 2. the operator will use his/her fingers 32 and 33 to grasp the enlarged finger grip 30 of the plug body 24 to pull the plug body away from and out of the plug recess 20 on the face plate 15. This progressively pulls the insulated conductor cord 26 from its reel 40 and through the opening 27 and the plug recess 20 so that the plug 22 can reach the communication device 35. The operator inserts the electrical contact 28 of the plug body 24 into the port 51 of the communication device to make contact with the battery of the communication device to recharge the battery.

When the battery has been recharged, the electrical plug 22 can be removed by applying the fingers of the person to the protruding portion of the plug body 24, to withdraw the electrical contact 28 of the plug from the communication device and then allow the spring of the reel to urge the conductor cord toward the plug recess, through the electrical cord opening 27 of the face plate and into the plug support box 14 until the plug 22 is nested in the plug recess or port 20 and the cord 26 is retracted into the plug support box.

Although a preferred embodiment of the invention has been disclosed in detail herein, variations and modifications of the disclosed embodiment can be made without departing from the spirit and scope of the invention as set forth in the following claims.

The invention claimed is:

1. A retractable wall mounted electrical plug assembly for charging a portable battery-charged communication device, comprising:
  a support box for mounting in a wall structure of a building in alignment with a wall opening having a size and shape for receiving an electrical power wall socket with a plurality of standard electrical power receptacles in the wall structure, the support box including a box opening, a face plate having an interior surface facing the support box and mounted to the support box about the box opening, and an exterior surface facing away from the support box, the exterior surface of the face plate defining a plug recess, an electrical plug sized and shaped to telescopically fit in the plug recess, the electrical plug designed to connect to and charge the portable battery-charged communication device, a cord opening extending from the plug recess to the interior of the support box, an insulated electrical conductor cord including an outer end connected to the plug, an intermediate portion extending between the plug and through the cord opening and into the support box, and an inner end in the support box for connection to an electrical current source.

2. The retractable wall mounted electrical plug assembly of claim 1 and further including a magnet positioned in the support box in alignment with the plug recess for releasably holding the plug in the plug recess.

3. The retractable wall mounted electrical plug assembly of claim 1 and further including spring means supported by the support box for retracting the cord through the cord opening into the support box.

4. The retractable wall mounted electrical plug assembly of claim 1, wherein the electrical plug includes an electrical contact that fits into the plug recess and an enlarged finger grip that faces away from the electrical contact, the enlarged finger grip fixedly attached to the electrical plug via an outwardly extending stem so that the enlarged finger grip resides at a fixed position over and in front of the face plate, the enlarged finger grip extending away from the plug recess for gripping by human fingers.

5. The retractable wall mounted electrical plug assembly of claim 1, further comprising an electrical power port adjacent to the plug recess for receiving the retractable plug, the electrical power port having a standard electrical power receptacle that is accessible in the face plate.

6. A retractable electrical plug assembly for charging a portable battery-charged communication device, comprising:

a support box for mounting in a wall structure of a building in alignment with a wall opening in the wall structure, the wall opening having a size and shape for receiving an electrical power wall socket in the wall structure, a face plate having an interior surface for facing the support box and for mounting to the support box, and an exterior surface for facing away from the support box, a retractable plug having an electrical contact that is sized and shaped to fit a plug receptacle of the portable battery-charged communication device, the plug including a finger grip extending away from the electrical contact sized for grasping by human fingers as the plug is being connected to the portable battery charged communication device, a plug recess formed in the face plate sized and shaped to receive the electrical contact of the retractable plug, a cord opening in the face plate extending from the plug recess to the interior of the support box, an insulated electrical conductor cord extending through the cord opening and including an outer end connected to the retractable plug, an intermediate portion extending between the retractable plug and through the cord opening and into the support box, and an inner end in the support box for connection to an electrical current source, and an electrical power port adjacent to the plug recess for receiving the retractable plug, the electrical power port having a standard electrical power receptacle that is accessible in the face plate.

7. The retractable electrical plug assembly of claim 6 and further including a magnet positioned in the support box in alignment with the plug recess for releasably holding the plug in the plug recess.

8. The retractable electrical plug assembly of claim 6 and further including spring means supported by the support box for retracting the cord through the cord opening into the support box.

9. The retractable electrical plug assembly of claim 6, wherein the retractable plug includes a plug body, the electrical contact extends from the plug body and together the plug body and the electrical contact telescopically fit within the plug recess, and an enlarged finger grip that faces away from the electrical contact, and when the electrical plug is inserted in the plug recess, the enlarged finger grip is sized to extend away from the plug recess for gripping by human fingers, the enlarged finger grip fixedly attached to the plug body via an outwardly extending stem so that the enlarged finger grip resides at a fixed position over and in front of the face plate.

10. The retractable electrical plug assembly of claim 6 wherein the plug finger grip extends from the plug body at a right angle with respect to the electrical contact.

11. A retractable electrical plug assembly for mounting in a hollow wall structure for charging a portable battery-charged communication device, comprising:

a face plate having an interior surface for facing internally over an opening in a wall structure and an exterior surface for facing externally of the opening in the wall structure, the opening having a size and shape for receiving an electrical power wall socket with a plurality of standard electrical power receptacles in the wall structure, the face plate having a size and shape commensurate with the size and shape of the opening, a plug recess formed in the exterior surface of the face plate, a cord opening in the face plate extending from the plug recess to the interior of the face plate, a retractable electrical plug sized and shaped to fit into the plug recess, the electrical plug including a plug body and electrical contact extending from the plug body sized and shaped to fit into the plug recess, the electrical contact being sized and shaped to fit a plug receptacle of the battery charged portable communication device, and an electrical conductor cord extending from the retractable electrical plug and through the cord opening.

12. The retractable electrical plug assembly of claim 11 and further including a magnet supported at the interior surface of the face plate for releasably holding the electrical plug to the interior surface of the face plate.

13. The retractable electrical plug assembly of claim 11, wherein the retractable electrical plug includes a plug body, an electrical contact extending from the plug body, and the plug body and the electrical contact together are sized and shaped to telescopically fit within the plug recess, and a finger grip that faces away from the plug body and that is sized to extend away from the exterior surface of the face plate for gripping by human fingers when the electrical plug is inserted in the plug recess, the finger grip fixedly attached to the plug body via an outwardly extending stem so that the finger grip resides at a fixed position over and in front of the face plate.

14. The retractable electrical plug assembly of claim 11, and further including a magnet positioned in the support box in alignment with the plug recess for releasably holding the plug in the plug recess.

15. The retractable electrical plug assembly of claim 11 and further including spring means in the support box for retracting the cord through the cord opening into the support box.

16. The retractable electrical plug assembly of claim 11, wherein the retractable plug includes a plug body, the electrical contact extends from the plug body and together the plug body and the electrical contact telescopically fit within the plug recess, and an enlarged finger grip that faces away from the electrical contact, and when the electrical plug is inserted in the plug recess, the enlarged finger grip extends away from the plug recess for gripping by human fingers.

17. The retractable electrical plug assembly of claim 11 wherein the plug finger grip extends from the plug body at an angle with respect to the electrical contact.

18. The retractable electrical plug assembly of claim 11, further comprising an electrical power port adjacent to the plug recess for receiving the retractable plug, the electrical power port having a standard electrical power receptacle that is accessible in the face plate.

19. A face plate assembly for an electrical wall outlet for electrical power on a wall comprising:
  (a) an electrical plug comprising:
    a body,
    an electrical contact extending in a first direction away from the body,
    a finger grip extending away from the body in a second direction that is fixed and that is normal to the first direction,
    an insulated electrical cord extending away from the body in a third direction that is fixed and that is normal to the first direction and opposite to the second direction of the finger grip,
  (b) a recess that contains the electrical plug therein, and
  (c) wherein the electrical contact extends in a plane that is parallel to the wall, the finger grip extends outwardly away from the recess in the face plate and the wall, and the cord extends inwardly away from the recess and toward the wall.

* * * * *